(12) United States Patent
Heck

(10) Patent No.: US 9,457,800 B2
(45) Date of Patent: Oct. 4, 2016

(54) METHOD AND DEVICE FOR DRIVING A MOTOR VEHICLE WITH HYBRID DRIVE

(71) Applicant: Dr. Ing. h.c. F. Porsche Aktiengesellschaft, Stuttgart (DE)

(72) Inventor: Marcus Heck, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 33 days.

(21) Appl. No.: 14/324,101

(22) Filed: Jul. 4, 2014

(65) Prior Publication Data
US 2015/0019056 A1    Jan. 15, 2015

(30) Foreign Application Priority Data
Jul. 11, 2013    (DE) .................. 10 2013 107 330

(51) Int. Cl.
| | |
|---|---|
| *B60L 9/00* | (2006.01) |
| *B60W 20/00* | (2016.01) |
| *B60W 10/06* | (2006.01) |
| *B60W 10/08* | (2006.01) |

(52) U.S. Cl.
CPC .............. *B60W 20/40* (2013.01); *B60W 10/06* (2013.01); *B60W 10/08* (2013.01); *Y02T 10/6286* (2013.01); *Y10S 903/93* (2013.01)

(58) Field of Classification Search
CPC .... B60W 20/40; B60W 10/06; B60W 10/08; B60W 20/00; B60W 2510/244; B60W 10/26; Y10S 903/93
USPC .................. 701/22; 180/65.265; 903/930
See application file for complete search history.

(56) References Cited

U.S. PATENT DOCUMENTS

| | | | |
|---|---|---|---|
| 8,655,526 B2 * | 2/2014 | Schwenke | F02N 11/0862 701/113 |
| 8,720,401 B2 * | 5/2014 | Vogt | F02N 11/0814 123/179.25 |

(Continued)

FOREIGN PATENT DOCUMENTS

| | | |
|---|---|---|
| DE | 10246978 A1 | 4/2004 |
| DE | 102012000036 A1 | 7/2012 |

*Primary Examiner* — Shardul Patel
(74) *Attorney, Agent, or Firm* — Leydig, Voit & Mayer, Ltd.

(57) ABSTRACT

A method for driving a motor vehicle includes selecting a drive mode. The motor vehicle has a hybrid drive including an internal combustion engine and an electric machine for providing a drive torque (t) for driving the motor vehicle. The motor vehicle is drivable by a torque of the internal combustion engine, by virtue of the internal combustion engine being started, or by a torque of the electric machine. The method includes detecting an amount of running activity ($t_B$) of the internal combustion engine. The drive mode is selected based on the detected amount of running activity ($t_B$).

12 Claims, 2 Drawing Sheets

(56) References Cited

U.S. PATENT DOCUMENTS

| | | | | |
|---|---|---|---|---|
| 8,839,754 B2* | 9/2014 | Bouchon | ............... | B60W 10/06 123/179.3 |
| 2007/0272186 A1* | 11/2007 | Fukushima | ........... | B60W 10/06 123/179.3 |
| 2010/0000812 A1* | 1/2010 | Deuble | .................... | B60K 6/48 180/65.265 |
| 2011/0276213 A1* | 11/2011 | Tomatsuri | .............. | B60K 6/365 701/22 |
| 2011/0288703 A1* | 11/2011 | Falkenstein | ............. | B60K 6/48 701/22 |
| 2012/0072063 A1* | 3/2012 | Kato | ...................... | B60K 6/445 701/22 |
| 2012/0179312 A1* | 7/2012 | Schwenke | ........... | F02N 11/0862 701/22 |
| 2012/0277946 A1* | 11/2012 | Yamamoto | ............. | B60K 6/445 701/22 |
| 2013/0284125 A1* | 10/2013 | Zollner | .................... | B60K 6/48 123/2 |
| 2014/0142796 A1* | 5/2014 | Zollner | ................. | B60W 10/02 701/22 |
| 2015/0032316 A1* | 1/2015 | Chin | ....................... | B60K 6/52 701/22 |

* cited by examiner

METHOD AND DEVICE FOR DRIVING A MOTOR VEHICLE WITH HYBRID DRIVE

CROSS REFERENCE TO RELATED APPLICATIONS

Priority is claimed to German Patent Application No. DE 10 2013 107 330.1, filed on Jul. 11, 2013, the entire disclosure of which is hereby incorporated by reference herein.

FIELD

The present invention relates to a method for driving a motor vehicle having a hybrid drive, a hybrid drive of a motor vehicle, and a motor vehicle drive train including a hybrid drive comprising an internal combustion engine and an electric machine.

BACKGROUND

In the field of hybrid drive systems, it is generally known for the motor vehicle to be driven purely electrically by means of the electric machine or driven exclusively by means of the internal combustion engine. It is also known, upon start-up of the motor vehicle, that is to say in the event of a key-initiated start, for the internal combustion engine to be started by means of the electric machine and for the motor vehicle to be driven by means of the internal combustion engine, or, upon start-up of the motor vehicle, for only the electric machine to be used to drive the motor vehicle and, if appropriate, for the internal combustion engine to be started during travel by being drag-started by means of the electric machine.

A disadvantage of the internal combustion engine being started by drag-starting during travel is that, during said process, the traction battery of the motor vehicle is subject to intense load and under certain conditions the traction battery can sustain permanent damage. Furthermore, the internal combustion engine is generally subject to higher wear when started by drag-starting by means of the electric machine than when started by cranking by means of the electric machine, such that under certain conditions, such a start by drag-starting should be avoided.

DE 10 2012 000 036 A1 discloses a method for the start-up of an internal combustion engine of a hybrid drive, in which method a torque for the start-up of the internal combustion engine is set as a function of a temperature of the internal combustion engine. A disadvantage here is that consideration is not given to all influential variables and start-up variations that have a significant influence on wear of the internal combustion engine.

DE 102 46 978 A1 discloses a method for the starting of a drive unit of a motor vehicle, in which method different modes for the starting of the internal combustion engine are set as a function of a temperature of the internal combustion engine. A disadvantage here is that consideration is not given to the wear in the event of drag-starting by means of the electric motor.

SUMMARY

In an embodiment, the present invention provides a method for driving a motor vehicle having a hybrid drive including an internal combustion engine and an electric machine for providing a drive torque (t) for driving the motor vehicle. The motor vehicle is drivable by a torque of the internal combustion engine, by virtue of the internal combustion engine being started, or by a torque of the electric machine. The method includes detecting an amount of running activity ($t_B$) of the internal combustion engine. A drive mode is selected based on the detected amount of running activity ($t_B$).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
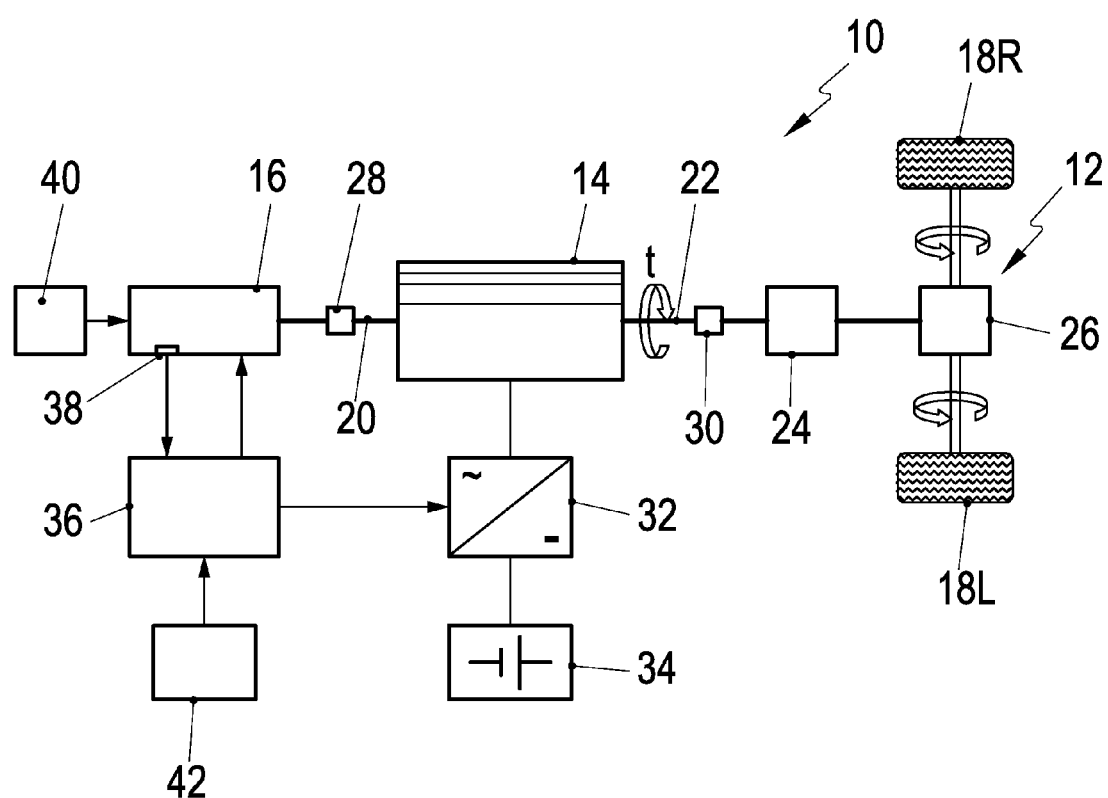
FIG. 1 schematically shows a motor vehicle having a hybrid drivetrain and a control unit for the control of the drive assemblies of the hybrid drivetrain.

An aspect of the present invention provides a reduction of the wear of an internal combustion engine of a hybrid drivetrain in particular in a running-in phase of the internal combustion engine.

In an embodiment, the present invention provides a method for driving a motor vehicle having a hybrid drive, wherein the hybrid drive has an internal combustion engine and an electric machine for providing a drive torque for driving the motor vehicle, wherein the motor vehicle can be driven either by means of a torque of the internal combustion engine, by virtue of the internal combustion engine being started, or by means of a torque of the electric machine, by virtue of the electric machine being activated.

In another embodiment the present invention provides a device for controlling a hybrid drive of a motor vehicle, wherein the hybrid drive has an internal combustion engine and an electric machine for providing a drive torque for driving the motor vehicle, wherein the motor vehicle can be driven by means of a torque of the internal combustion engine or by means of a torque of the electric machine.

In another embodiment the present invention provides a motor vehicle drivetrain having a hybrid drive which has an internal combustion engine and an electric machine.

In an embodiment, the present invention provides a method in which an amount of running activity of the internal combustion engine is detected and the drive mode is selected on the basis of the detected amount of running activity.

Furthermore, in an embodiment, the present invention provides a device including a running activity detection unit, which is designed to detect the amount of running activity of the internal combustion engine, and a control unit which is designed to either activate the internal combustion engine so as to drive the motor vehicle, or activate the electric machine so as to drive the motor vehicle, on the basis of the detected amount of running activity.

Further, in an embodiment, the present invention provides a motor vehicle drivetrain including a device for controlling the hybrid drivetrain, as described above.

By virtue of the fact that the drive mode is selected on the basis of the detected amount of running activity, it is possible in the case of low amounts of running activity, when the internal combustion engine has not yet been run in, to dispense with the electric drive upon driveaway and the associated starting method of drag-starting by means of the electric machine, such that, during the sensitive running-in phase, the internal combustion engine can be protected against excessive wear. Since the driving of the motor vehicle by means of the internal combustion engine in the case of low amounts of running activity is more gentle and generally avoids a wear-intensive start of the internal combustion engine by drag-starting, it is thus possible for unnecessary wear to be avoided in the running-in phase of the internal combustion engine and for the service life of the internal combustion engine to be increased overall.

The object of the present invention is thus achieved in its entirety.

In a preferred embodiment, the temperature of the internal combustion engine is determined and the drive mode is furthermore selected on the basis of the detected temperature of the internal combustion engine.

In this way, consideration can be given to a further wear-influencing factor, and the advantages of the hybrid drive at the corresponding temperature of the internal combustion engine can be utilized.

In a further preferred embodiment, the motor vehicle is driven by means of the internal combustion engine if the temperature is lower than a predefined temperature threshold value.

In this way, starting of the internal combustion engine by drag-starting by means of the electric machine can be avoided at low temperatures.

It is furthermore preferable for the motor vehicle to be driven by means of the electric machine if the temperature is higher than the predefined temperature threshold value.

In this way, the advantages of the hybrid drive can be utilized with little wear if the temperature of the internal combustion engine is above a critical temperature.

It is also preferable for the predefined temperature threshold value to be reduced as a function of the detected amount of running activity.

In this way, a relatively high temperature threshold value can be defined in the case of low amounts of running activity, and a lower temperature threshold value can be defined with progressive running activity, such that, with progressive running activity, the hybrid drive can be fully utilized and, at the same time the internal combustion engine is preserved in the case of low amounts of running activity.

It is furthermore preferable if the predefined temperature is, after a predefined amount of running activity, reduced from a first temperature value to a second temperature value.

In this way, after running-in the internal combustion engine, the temperature threshold value can be reduced to such an extent that the hybrid drive can be fully utilized.

It is furthermore preferable for the predefined amount of running activity to correspond to a running-in phase of the internal combustion engine.

In this way, the internal combustion engine can be preserved in the running-in phase and fully utilized after the running-in phase.

It is furthermore preferable for the amount of running activity to correspond to a distance travelled by the motor vehicle.

In this way, the amount of running activity can be determined with little technical outlay.

It is furthermore preferable for the amount of running activity to be an operating duration of the internal combustion engine.

In this way, the amount of running activity of the internal combustion engine can be precisely determined.

It is furthermore preferable for the drive mode to be selected upon the start-up of the motor vehicle, and for the motor vehicle to be driven correspondingly for driveway purposes.

In this way, upon driveaway of the motor vehicle, the need for starting by drag-starting is eliminated.

Overall, by means of the present invention, the wear of the internal combustion engine preferably in a running-in phase can be reduced, and thus the performance of the drive as a whole and the service life of the internal combustion engine can be increased. By virtue of the temperature of the internal combustion engine being taken into consideration, it is possible for particularly wear-intensive situations, such as for example the drag-starting of the internal combustion engine at a very low temperature, to be avoided, whereby the internal combustion engine as a whole and the traction battery can be conserved.

In FIG. 1, a motor vehicle is schematically illustrated and is denoted generally by the reference numeral 10. The motor vehicle 10 has a drivetrain 12 which, in the present case, comprises an electric machine 14 and an internal combustion engine 16 for providing drive power. The drivetrain serves for driving driven wheels 18R, 18L of the motor vehicle 10. The internal combustion engine 16 is connected or connectable to the electric machine 14 via a crankshaft 20, wherein the internal combustion engine 16 and the electric machine 14 provide a drive torque t at a drive output shaft 22. The drive output shaft 22 is connected or connectable to the driven wheels 18R, 18L via a transmission unit 24 and a differential gear 26 in order to transmit the drive torque t to the driven wheels 18R, 18L. The crankshaft 20 and the drive output shaft 22 each have a clutch 28, 30 for detachably connecting the internal combustion engine 16 to the electric machine 14, and the electric machine 14 to the transmission unit 24, respectively.

The internal combustion engine 16 is connectable to the electric machine 14 by means of the clutch 28 in order to transmit a torque of the internal combustion engine 16 to the electric machine 14. The rotor of the electric machine 14 is connected to the drive output shaft 22 in order to transmit the drive torque t via the transmission unit 24 and the differential to the driven wheels 18R, 18L. The torque t may, depending on the operating mode, be formed by the torque of the electric machine 14, the torque of the internal combustion engine 16 or by a sum of the two torques.

The electric machine 14 is activated, and supplied with electrical energy, by means of an inverter 32. The inverter is connected to an energy supply unit 34 or an electrical energy store 34 (for example battery) of the vehicle 10 and serves for converting a direct-current voltage provided by the energy supply unit 34 into alternating current in general or into a number of phase currents of the phases of the electric machine 14.

The motor vehicle 10 has a control unit 36 which is connected to the internal combustion engine 16 and to the inverter 32 and control these correspondingly. The internal combustion engine 16 is assigned a temperature sensor 38 which detects a temperature of the internal combustion engine 16, preferably an oil temperature of the internal combustion engine 16, and transmits the detected data to the control unit 36.

For the starting and driveaway of the motor vehicle 10, it is possible on the one hand for only the electric machine 14 to be used and to be activated correspondingly by the control unit 36 via the inverter 32, wherein the clutch 28 is opened, such that the motor vehicle 10 is driven purely electrically. Alternatively, the internal combustion engine 16 may be started and the motor vehicle 10, with clutches 28 and 30 closed, the drive torque t corresponds to the torque of the internal combustion engine 16 and optionally additionally the torque of the electric machine 14, such that the motor vehicle 10 is driven under motor power.

Accordingly, when the motor vehicle 10 is at a standstill, for example upon start-up of the vehicle 10, the so-called key-initiated start, the internal combustion engine 16 may be started by means of the electric machine 14 via the crankshaft 20 or by means of a separate starter 40. If, during the start-up of the motor vehicle 10, only the electric machine 14 is used for the driveaway of the motor vehicle 10, the internal combustion engine 16 may be drag-started during travel by closing the clutch 28. The drag-starting of the internal combustion engine 16 by means of the electric machine 14 subjects the battery 34 to intense loading, such that drag-starting can be permitted only under certain conditions. Furthermore, the wear of the internal combustion engine 16 is increased under certain conditions, for example at very low temperatures, such that said drag-starting should be avoided.

Purely electric driveaway by means of the electric machine 14 and the associated drag-starting of the internal combustion engine 16 is permitted as a function of the temperature of the internal combustion engine 16 and as a function of an amount of running activity of the internal combustion engine 16. For this purpose, the control unit 36 is assigned a running activity detection unit 42 which detects the amount of running activity of the internal combustion engine 16. Here, the amount of running activity may be detected either as an operating duration of the internal combustion engine 16 or, in general, as a number of kilometers travelled by the motor vehicle 10. If the temperature sensor 38 detects a temperature value of the internal combustion engine 16 which lies below a threshold temperature, and the running activity of the internal combustion engine 16 has not yet reached a certain value, only a driveaway of the motor vehicle 10 by means of the internal combustion engine 16 is permitted. The detection of the temperature and of the amount of running activity is performed preferably upon the starting of the motor vehicle and the corresponding operating mode is selected, though this may also be performed during a stoppage in travel, for example in the context of a start-stop function. If, upon starting, the temperature of the internal combustion engine 16 falls below the predefined value for the detected amount of running activity, the key-initiated start corresponds to a start of the internal combustion engine 16. If the temperature of the internal combustion engine 16 falls below the predefined value, drag-starting during travel can be permitted, such that in this case, the key-initiated start corresponds to the starting of the electric machine 14.

In this way, by means of the detection of the temperature of the internal combustion engine and of the amount of running activity of the internal combustion engine, the drive mode can be selected by means of the control unit, and the internal combustion engine 16 can be activated, or the electric machine 14 can be activated via the inverter 32, by the control unit 36. The predefined temperature threshold value may preferably be set to be constant during a running-in phase of the internal combustion engine 16 and reduced to a second value after the completion of the running-in phase and kept constant for the remainder of the running of the motor vehicle. Alternatively, the temperature threshold value may also be reduced in continuous fashion, or corresponding to a predefined function, as a function of the amount of running activity of the internal combustion engine 16, and correspondingly approach a target value asymptotically.

By means of the selection of the drive mode as a function of the temperature of the internal combustion engine 16 and as a function of the amount of running activity of the internal combustion engine 16, the wear of the components and in particular of the internal combustion engine 16 and of the battery 34 can be reduced.

Figure 2:
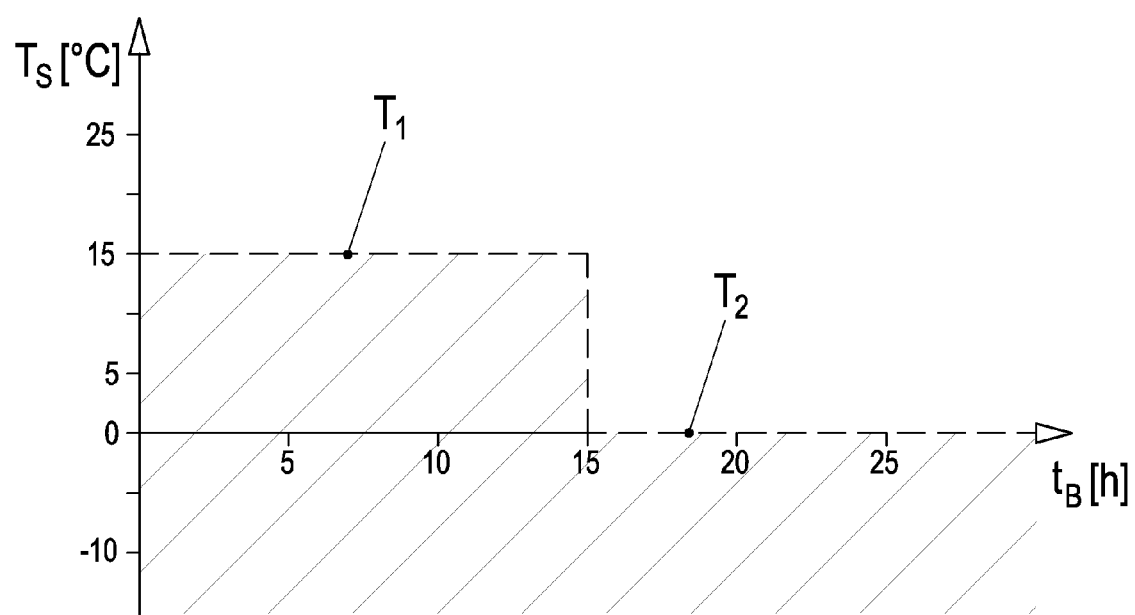
FIG. 2 shows a diagram for explaining the running-activity-dependent temperature threshold value.

FIG. 2 schematically illustrates a profile $T_s$ of the temperature threshold value as a function of the amount of running activity $t_B$ of the internal combustion engine 16.

The temperature threshold value $T_s$ is illustrated by dashed lines and is set to be constant up to an amount of running activity $t_B$ of the internal combustion engine 16 of 15 operating hours. Said first temperature threshold value $T_1$ is in this case 15° C. After the amount of running activity of 15 operating hours has elapsed, the temperature threshold value $T_s$ is reduced to a second temperature threshold value $T_2$. Above the, in this case, dashed line of the temperature threshold value $T_s$, a key-initiated start corresponds to an electric start of the electric machine 14, and below the dashed line of the temperature threshold value $T_s$, a key-initiated start is a start of the internal combustion engine 16. The time until the first 15 operating hours has elapsed, which corresponds to a distance travelled of approximately 1000 kilometers, forms the running-in phase of the internal combustion engine 16. After the running-in phase, below 0° C., the starting of the internal combustion engine 16 is performed as the initial start when the motor vehicle 10 is started up.

It is self-evident that, for different engine types, the running-in phase can be defined to be longer or shorter, and the first temperature threshold value $T_1$ and the second temperature threshold value $T_2$ may be set to other values.

A continuous reduction of the temperature threshold value $T_s$, or a reduction in multiple stages, is also conceivable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for driving a motor vehicle having a hybrid drive that includes an internal combustion engine and an electric machine for providing a drive torque (t) for driving the motor vehicle, the motor vehicle being drivable by a torque of the internal combustion engine, by virtue of the internal combustion engine being started, or by a torque of the electric machine, the method comprising:
- detecting an amount of running activity ($t_B$) of the internal combustion engine using a running activity detection unit, the amount of running activity ($t_B$) being one of a total distance travelled by the motor vehicle or a total operating duration of the internal combustion engine;
- determining a temperature of the internal combustion engine using a temperature sensor;
- selecting, using a control unit, a drive mode based on the detected amount of running activity ($t_B$) and the determined temperature of the internal combustion engine; and
- driving the motor vehicle by at least one of the internal combustion engine or the electric machine based on the selected drive mode.

2. The method as recited in claim 1, wherein the motor vehicle is driven by the internal combustion engine if the determined temperature is lower than a predefined temperature threshold value (Ts).

3. The method as recited in claim 2, wherein the predefined temperature threshold value (Ts) is reduced as a function of the detected amount of running activity ($t_B$).

4. The method as recited in claim 3, wherein the predefined temperature threshold value (Ts) is, after a predefined amount of running activity, reduced from a first threshold value ($T_1$) to a second threshold value ($T_2$).

5. The method as recited in claim 4, wherein the predefined amount of running activity ($t_B$) corresponds to a running-in phase of the internal combustion engine.

6. The method as recited in claim 1, wherein the motor vehicle is driven by the electric machine if the determined temperature is higher than the predefined temperature threshold value (Ts).

7. The method as recited in claim 6, wherein the predefined temperature threshold value (Ts) is reduced as a function of the detected amount of running activity ($t_B$).

8. The method as recited in claim 7, wherein the predefined temperature threshold value (Ts) is, after a predefined amount of running activity, reduced from a first threshold value ($T_1$) to a second threshold value ($T_2$).

9. The method as recited in claim 8, wherein the predefined amount of running activity ($t_B$) corresponds to a running-in phase of the internal combustion engine.

10. The method as recited in claim 1, wherein the drive mode is selected upon the start-up of the motor vehicle, and the motor vehicle is driven correspondingly for driveaway purposes.

11. A device for controlling a hybrid drive of a motor vehicle, the hybrid drive having an internal combustion engine and an electric machine for providing a drive torque (t) for driving the motor vehicle, the motor vehicle being drivable by a torque of the internal combustion engine or by a torque of the electric machine, the device comprising:
- a running activity detection unit configured to detect an amount of running activity ($t_B$) of the internal combustion engine, the amount of running activity ($t_B$) being one of a total distance travelled by the motor vehicle or a total operating duration of the internal combustion engine;
- a temperature sensor configured to determine a temperature of the internal combustion engine; and
- a control unit configured to selectively activate either the internal combustion engine so as to drive the motor vehicle or the electric machine so as to drive the motor vehicle, based on the detected amount of running activity ($t_B$) and the determined temperature.

12. A motor vehicle drivetrain for driving a motor vehicle, the drive train comprising:
- a hybrid drive including an internal combustion engine and an electric machine for driving the motor vehicle, the motor vehicle being drivable by a torque of the internal combustion engine or by a torque of the electric machine; and
- a device for controlling the hybrid drive including:
  - a running activity detection unit configured to detect an amount of running activity ($t_B$) of the internal combustion engine, the amount of running activity ($t_B$) being one of a total distance travelled by the motor vehicle or a total operating duration of the internal combustion engine;
  - a temperature sensor configured to determine a temperature of the internal combustion engine; and
  - a control unit configured to selectively activate either the internal combustion engine so as to drive the motor vehicle or the electric machine so as to drive the motor vehicle, based on the detected amount of running activity ($t_B$) and the determined temperature.

* * * * *